United States Patent
Gao

(10) Patent No.: US 11,588,577 B2
(45) Date of Patent: Feb. 21, 2023

(54) COMMUNICATION DATA PROCESSING METHOD AND APPARATUS, TERMINAL DEVICE, AND STORAGE MEDIUM

(71) Applicant: BEIJING XIAOMI MOBILE SOFTWARE CO., LTD., Beijing (CN)

(72) Inventor: Yi Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/033,899

(22) Filed: Sep. 27, 2020

(65) Prior Publication Data
US 2021/0320751 A1 Oct. 14, 2021

(30) Foreign Application Priority Data

Apr. 14, 2020 (CN) .......................... 202010290479.2

(51) Int. Cl.
H04W 76/19 (2018.01)
H04L 1/00 (2006.01)
H04W 76/11 (2018.01)

(52) U.S. Cl.
CPC ........... *H04L 1/0068* (2013.01); *H04W 76/11* (2018.02); *H04W 76/19* (2018.02)

(58) Field of Classification Search
CPC ..... H04W 76/11; H04W 76/19; H04W 76/25; H04W 28/10; H04W 28/20; H04W 56/00; H04W 72/0453; H04L 1/0068
See application file for complete search history.

(56) References Cited

U.S. PATENT DOCUMENTS

| 6,556,552 B1* | 4/2003 | Nakagomi | H04W 48/16 370/332 |
| 6,731,600 B1* | 5/2004 | Patel | H04L 47/283 370/468 |
| 8,260,284 B2 | 9/2012 | Hidaka | |
| 10,812,218 B2* | 10/2020 | Dong | H04L 1/0026 |

(Continued)

FOREIGN PATENT DOCUMENTS

| CN | 1773985 A | 5/2006 |
| CN | 104735088 A | 6/2015 |

(Continued)

OTHER PUBLICATIONS

Supplementary European Search Report in the European application No. 20208928.0, dated May 17, 2021.

(Continued)

*Primary Examiner* — Jean A Gelin
(74) *Attorney, Agent, or Firm* — Syncoda LLC; Feng Ma

(57) ABSTRACT

A communication data processing method can be applied to a terminal device, and include: detecting an actual transmission rate between the terminal device and a base station; and performing, if the actual transmission rate is less than a preset rate threshold for maintaining a connection between the terminal device and the base station, communication of compensation data with a preset server through the base station according to a difference between the actual transmission rate and the preset rate threshold, where the sum of a transmission rate of the compensation data and the actual transmission rate is greater than or equal to the preset rate threshold.

17 Claims, 5 Drawing Sheets

(56) References Cited

U.S. PATENT DOCUMENTS

| | | | |
|---|---|---|---|
| 2005/0128976 A1* | 6/2005 | Uehara | H04W 88/181 |
| | | | 370/252 |
| 2006/0165125 A1* | 7/2006 | Fushimi | H04N 1/32704 |
| | | | 370/474 |
| 2006/0183483 A1 | 8/2006 | Hidaka | |
| 2006/0246847 A1* | 11/2006 | Kim | H04W 28/14 |
| | | | 455/69 |
| 2008/0260393 A1* | 10/2008 | Youn | H04L 9/0858 |
| | | | 398/152 |
| 2009/0010354 A1* | 1/2009 | Sudo | H04L 1/0029 |
| | | | 375/267 |
| 2010/0240409 A1* | 9/2010 | Muraoka | H04L 25/0262 |
| | | | 455/522 |
| 2011/0069966 A1* | 3/2011 | Kato | H04B 10/40 |
| | | | 398/136 |
| 2012/0287892 A1 | 11/2012 | Hidaka | |
| 2014/0334816 A1* | 11/2014 | Guo | H04Q 11/0066 |
| | | | 398/45 |
| 2015/0250015 A1 | 9/2015 | Liu | |
| 2016/0381691 A1 | 12/2016 | Panchal et al. | |
| 2017/0078132 A1* | 3/2017 | Huang | H04L 27/2688 |
| 2017/0105164 A1* | 4/2017 | Liu | H04W 72/04 |
| 2017/0245301 A1* | 8/2017 | Han | H04W 72/12 |
| 2017/0250764 A1* | 8/2017 | Wen | H04W 72/042 |
| 2019/0200287 A1* | 6/2019 | Liu | H04W 28/0284 |
| 2021/0014767 A1* | 1/2021 | Xu | H04W 72/1289 |
| 2021/0211937 A1* | 7/2021 | Qu | H04L 47/125 |

FOREIGN PATENT DOCUMENTS

| | | |
|---|---|---|
| CN | 105898408 A | 8/2016 |
| CN | 106162768 A | 11/2016 |
| CN | 108064071 A | 5/2018 |
| CN | 108471630 A | 8/2018 |
| CN | 108668323 A | 10/2018 |
| CN | 110691372 A | 1/2020 |
| CN | 110943933 A | 3/2020 |
| WO | 2014201912 A1 | 12/2014 |
| WO | 2019101208 A1 | 5/2019 |

OTHER PUBLICATIONS

First Office Action of the Chinese application No. 202010290479.2, dated Aug. 27, 2021.
Second Office Action of the Chinese application No. 202010290479.2, dated Feb. 22, 2022.

* cited by examiner

COMMUNICATION DATA PROCESSING METHOD AND APPARATUS, TERMINAL DEVICE, AND STORAGE MEDIUM

CROSS-REFERENCE TO RELATED APPLICATIONS

This application claims priority to Chinese patent application No. 202010290479.2 filed on Apr. 14, 2020, the disclosure of which is hereby incorporated by reference in its entirety.

BACKGROUND

With the development of communication technologies, a fifth-generation mobile communication technology (5G) is in a stage of rapid construction and improvement. 5G has the performance characteristics of high data rate, low latency, low cost, high capacity, large-scale device connection, etc. Therefore, communication electronic devices such as 5G mobile phones have gradually become available and popularized.

SUMMARY

The disclosure relates to the technical field of communications, and more particularly, to a communication data processing method and apparatus, a terminal device, and a storage medium.

The disclosure provides a communication data processing method and apparatus, a terminal device, and a storage medium.

According to a first aspect of embodiments of the disclosure, a communication data processing method is provided. The method may be applied to a terminal device, and may include the following operations.

An actual transmission rate between the terminal device and a base station is detected. In response to the actual transmission rate being less than a preset rate threshold for maintaining a connection between the terminal device and the base station, performing, according to a difference between the actual transmission rate and the preset rate threshold, communication of compensation data with a preset server through the base station. The sum of a transmission rate of the compensation data and the actual transmission rate is greater than or equal to the preset rate threshold.

According to a second aspect of embodiments of the disclosure, a terminal device is provided, which may include at least a processor and a memory for storing executable instructions runnable on the processor. When the executable instructions are executed by the processor, the processor is configured to perform the operations in any of the above communication data processing methods for a terminal device.

According to a third aspect of embodiments of the disclosure, a non-transitory computer-readable storage medium is provided, which may have computer-executable instructions stored. The computer-executable instructions, when executed by a processor, may implement the operations in any of the above communication data processing methods for a terminal device.

It should be understood that the above general description and the following detailed description are exemplary and explanatory only, and are not intended to limit the disclosure.

BRIEF DESCRIPTION OF THE DRAWINGS

The accompanying drawings, which are incorporated in and constitute a part of this disclosure, illustrate embodiments consistent with the disclosure and together with the description serve to explain the principles of the disclosure.

DETAILED DESCRIPTION

Figure 1:
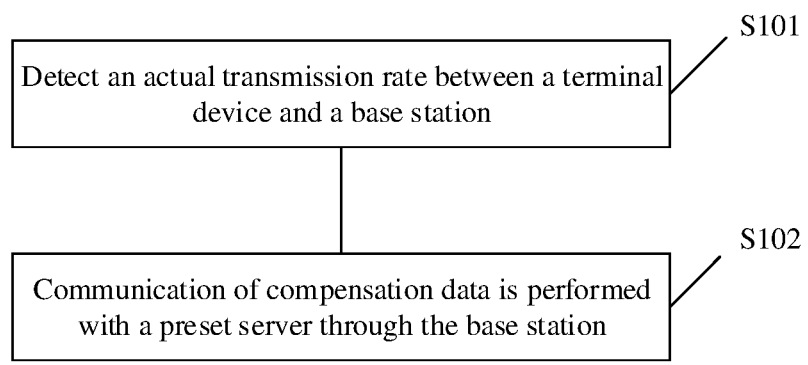
FIG. 1 is a first flowchart of a communication data processing method according to some exemplary embodiments.

A large number of 5G communication base stations are still in the construction stage, and some 5G communication resources adopt one or more hardware devices of an original fourth generation mobile communication technology (4G) base station to improve the deployment of 5G resources. Therefore, 5G base station resources are still relatively limited, which may not be able to meet communication demands of a large number of 5G terminals, and an allocation mode of the 5G base station resources may not meet terminals that need to connect to 5G resources for a long time, thereby reducing user experience.

According to a first aspect of embodiments of the disclosure, a communication data processing method is provided. The method may be applied to a terminal device, and may include the following operations.

An actual transmission rate between the terminal device and a base station is detected. In response to the actual transmission rate being less than a preset rate threshold for maintaining a connection between the terminal device and the base station, performing, according to a difference between the actual transmission rate and the preset rate threshold, communication of compensation data with a preset server through the base station. The sum of a transmission rate of the compensation data and the actual transmission rate is greater than or equal to the preset rate threshold.

In some embodiments, the method may further include the following operations. An identifier of the base station connected to the terminal device. The preset rate threshold is determined according to the identifier and a predetermined threshold list. The threshold list includes preset rate thresholds and identifiers of one or more base stations, where each of the preset rate thresholds corresponds to a respective one of the identifiers of the one or more base stations.

In some embodiments, the method may further include the following operation. The preset rate threshold is acquired from the threshold list stored in a memory of the preset server or the terminal device.

In some embodiments, the method may further include the following operations. in response to the identifier of the base station being not comprised in the threshold list, receiving the preset rate threshold from the base station. The identifier of the base station and the preset rate threshold corresponding to the identifier of the base station are added to the threshold list.

In some embodiments, the base station may be a network base station that provides one or more 5G communication services. After the operation of performing communication of compensation data with a preset server through the base station, the method may further include the following operations.

A 5G communication connection between the terminal device and the base station is maintained. Communication data is transmitted using the 5G communication connection.

In some embodiments, the method may further include the following operation. in response to the actual transmission rate being greater than or equal to the preset rate threshold, stopping transmitting the compensation data.

In some embodiments, the method may further include the following operations.

A second data volume of the compensation data is determined according to a first data volume per unit time corresponding to the difference between the actual transmission rate and the preset rate threshold. The second data volume is greater than or equal to the first data volume. The compensation data of the second data volume is acquired from data pre-stored in the terminal device.

In some embodiments, the method may further include the following operations. In response to receiving the compensation data, determining, according to a communication address of a source of the compensation data, whether the compensation data comes from the preset server. In response to the compensation data coming from the preset server, discarding the compensation data.

According to a second aspect of embodiments of the disclosure, a communication data processing apparatus is provided. The apparatus may be applied to a terminal device, and may include a detection module and a first transmission module.

The detection module is configured to detect an actual transmission rate between the terminal device and a base station. The first transmission module is configured to perform communication of compensation data with a preset server through the base station according to a difference between the actual transmission rate and the preset rate threshold in response to the actual transmission rate being less than a preset rate threshold for maintaining a connection between the terminal device and the base station. The sum of a transmission rate of the compensation data and the actual transmission rate is greater than or equal to the preset rate threshold.

In some embodiments, the apparatus may further include a first determination module and a second determination module.

The first determination module is configured to determine an identifier of the base station connected to the terminal device. The second determination module is configured to determine the preset rate threshold according to the identifier and a predetermined threshold list, the threshold list including preset rate thresholds and identifiers of one or more base stations, where each of the preset rate thresholds corresponds to a respective one of the identifiers of the one or more base stations.

In some embodiments, the apparatus may further include a first acquisition module. The first acquisition module is configured to acquire the preset rate threshold from the threshold list stored in a memory of the preset server or the terminal device.

In some embodiments, the apparatus may further include a receiving module and an addition module. The receiving module is configured to receive the preset rate threshold from the base station in response to the identifier of the base station is not comprised in the threshold list. The addition module is configured to add the identifier of the base station and the preset rate threshold to the threshold list corresponding to the identifier of the base station.

In some embodiments, the base station may be a network base station that provides one or more 5G communication services. The apparatus may further include a maintaining module and a second transmission module. The maintaining module is configured to maintain a 5G communication connection between the terminal device and the base station; and the second transmission module is configured to transmit communication data using the 5G communication connection.

In some embodiments, the apparatus may further include a stopping module. The stopping module is configured to stop transmitting the compensation data in response to the actual transmission rate being greater than or equal to the preset rate threshold.

In some embodiments, the apparatus may further include a third determination module and a second acquisition module. The third determination module is configured to determine a second data volume of the compensation data according to a first data volume per unit time corresponding to the difference between the actual transmission rate and the preset rate threshold, the second data volume being greater than or equal to the first data volume. The second acquisition module is configured to acquire the compensation data of the second data volume from data pre-stored in the terminal device.

In some embodiments, the apparatus may further include a fourth determination module and a discarding module. The fourth determination module is configured to determine whether the compensation data comes from the preset server according to a communication address of a source of the compensation data in response to receiving the compensation data. The discarding module is configured to discard the compensation data in response to the compensation data coming from the preset server.

According to a third aspect of embodiments of the disclosure, a terminal device is provided, which may include at least: a processor and a memory for storing executable instructions runnable on the processor. When the processor is configured to run the executable instructions, the executable instructions may perform the operations in any of the above communication data processing methods for a terminal device.

According to a fourth aspect of embodiments of the disclosure, a non-transitory computer-readable storage medium is provided, which may have computer-executable instructions stored. The computer-executable instructions, when executed by a processor, may implement the operations in any of the above communication data processing methods for a terminal device.

Various embodiments of the disclosure can have one or more of the following advantages.

As a terminal device needs to have a certain transmission rate to maintain a communication connection state with a base station, if the transmission rate is lower than a preset rate threshold, the base station may be disconnected from the terminal device. Through the technical solution of the embodiments of the disclosure, the transmission rate between the terminal device and the base station can always be maintained above the preset rate threshold of the base station by the way of performing communication of compensation data with a preset server. On the one hand, the transmission of the compensation data maintains the transmission of a preset speed threshold and maintains the connection between the base station and the terminal, and the situation of disconnection between the base station and the terminal device is reduced. On the other hand, the terminal device maintains the connection with the base station, so that the situation of time waste or difficulty in re-establishing a connection with the base station when the terminal urgently needs to use base station resources is reduced, and the efficiency of the terminal device using the base station resources is improved.

Exemplary embodiments will be described in detail herein, examples of which are illustrated in the accompanying drawings. When the following description refers to the accompanying drawings, the same numbers in different drawings represent the same or similar elements unless otherwise indicated. The implementation modes described in the following exemplary embodiments do not represent all implementation modes consistent with the disclosure. On the contrary, they are merely examples of apparatuses and methods consistent with some aspects of the disclosure as detailed in the appended claims.

FIG. 1 is a flowchart of a communication data processing method, according to an exemplary embodiment. The method is applied to a terminal device. As shown in FIG. 1, the method includes the following steps.

In S101, an actual transmission rate between the terminal device and a base station is detected.

In S102, if the actual transmission rate is less than a preset rate threshold for maintaining a connection between the terminal device and the base station, communication of compensation data is performed with a preset server through the base station according to a difference between the actual transmission rate and the preset rate threshold. The sum of a transmission rate of the compensation data and the actual transmission rate is greater than or equal to the preset rate threshold.

In some embodiments of the disclosure, a terminal device establishes a communication connection with a base station, and there is data communication. The base station may be a 3G base station, a 4G base station, or a 5G base station, etc. The base station is configured to provide wireless communication connections for various terminal devices in a cell where the base station is located. When communication resources of the base station are limited, in order to guarantee the services of more terminal devices, it is often defaulted that the terminal device does not need to perform data communication when the transmission rate between the terminal device and the base station is low, thereby releasing the network connection. However, the disconnected terminal device needs to re-establish a communication connection with the base station when a large-traffic communication connection is required subsequently. At this moment, if the base station resources cannot be allocated, it is difficult to establish a connection again. For example, in the stage of 5G construction, 5G base station hardware resources are limited, 5G terminals are rapidly popularized, and the resources cannot be allocated to most terminal devices. Therefore, 5G base stations may use the above mechanism to disconnect terminal devices having a data transmission rate less than a preset rate threshold.

In some other embodiments, the communication connection between the terminal device and the base station includes communication connections of at least two types of networks. The network with high network performance in the at least two types of networks is determined as a network that needs to maintain a communication connection. For example, it is a network with high transmission rate or low transmission delay. That is, in some embodiments of the disclosure, maintaining the connection between the base station and the terminal device may refer to maintaining any communication connection between the terminal device and the base station, or maintaining a communication connection of a specific network communication system. For example, the base station may provide 4G and 5G network resources simultaneously, and if an actual transmission rate of a 5G communication between the terminal device and the base station is lower than the preset rate threshold, the base station will break the 5G communication connection and release the 5G resources. At this moment, there may still be a 4G connection between the terminal device and the base station. However, the embodiments of the disclosure need to maintain a 5G communication connection through the above mode of transmitting compensation data, so as to maintain high data transmission performance. For example, a terminal can connect to a 4G network and a 5G network simultaneously. Since the Quality of Service (QoS) of the 5G network is higher than the QoS of the 4G network, in order to ensure that the terminal maintains a higher communication QoS, the 5G network may be a network having a higher priority than the 4G network in maintaining communication connections.

Therefore, in some embodiments of the disclosure, for terminal devices that need to be connected for a long time and use base station resources, the data transmission rate between the terminal device and the base station is maintained by way of transmitting compensation data, so that the terminal device and the base station always have a data transmission rate greater than the preset rate threshold. The terminal device may monitor an actual transmission rate between the terminal device and a currently connected base station in real time. When the actual transmission rate is less than the preset rate threshold, the terminal device transmits compensation data with the preset server before the connection is disconnected by the base station. A data volume of the compensation data needs to be sufficient so that the sum of the transmission rate of the compensation data and the actual transmission rate is greater than or equal to the above preset rate threshold. In this way, the data transmission rate of the base station and terminal device will be at a level greater than or equal to the preset rate threshold. The base station will not actively disconnect from the terminal device.

In some embodiments of the disclosure, the terminal device or the preset server pre-stores the preset rate threshold of each base station, and searches for the corresponding preset rate threshold according to an identifier of the currently connected base station.

The above preset server may be a dedicated server for transmitting the above compensation data, or may be another server. The terminal device establishes a communication connection with the preset server through the base station. In some embodiments of the disclosure, the terminal device sends compensation data to the preset server, and the terminal device may also send a data request to the preset server and receive compensation data sent by the preset server. The transmitted compensation data may be data that does not contain the actual data content. Therefore, after the terminal device or the preset server receives the above compensation data, it may be discarded without any processing. For example, the preset server is a dedicated server that receives compensation data. All of the received data is compensation data, so the received data may be directly discarded without any processing. In addition, after receiving the compensation data, the preset server or the terminal device may also perform decoding and other processing to identify identification information therein. If it is confirmed that the received data is compensation data, it will be discarded, and a storage space will be released.

In some embodiments, when the base station detects that the data transmission rate with the terminal device is less than the preset rate threshold, a preset time period may continue to be detected. If the data transmission rate is always less than the preset rate threshold during the preset time period, the communication connection with the terminal device is broken. Therefore, in some embodiments of the disclosure, the above compensation data may be transmitted with the preset server within the above preset time period of the base station, so that a duration during which the data transmission rate between the base station and the terminal device is less than the preset rate threshold does not exceed the above preset time period, thereby ensuring that the base station is not disconnected from the terminal device.

In some other embodiments, the above actual transmission rate is the transmission rate of data generated by actual communication between the terminal device and the base station, and does not include the transmission rate of compensation data with the preset server. The actual transmission rate may refer to data transmission between the terminal device and the base station in the current unit time, or may be an average data transmission rate or a minimum data transmission rate within a period of time such as the above preset time period.

Through the technical solutions of embodiments of the disclosure, a transmission rate between a terminal device and a base station can always be maintained above a preset rate threshold of the base station by the way of performing communication of compensation data with a preset server, and the occur of the situation of disconnection between the base station and the terminal device can be reduced. The terminal device maintains the connection with the base station, so that the occur of the situation of time waste or difficulty in re-establishing a connection with the base station when the terminal urgently needs to use base station resources is reduced, and the efficiency of the terminal device using the base station resources is improved.

In some embodiments, the method further includes the following operations.

An identifier of the base station connected to the terminal device is determined. The preset rate threshold is determined according to the identifier and a predetermined threshold list, the threshold list including preset rate thresholds corresponding to base station identifiers of one or more base stations. In some embodiments, the identifier of the base station may be the base station identifier of the base station.

Since the terminal device includes a mobile communication device, such as a mobile phone, when the terminal device moves to different geographic locations, it may be connected to different base stations, and different base stations may have different preset rate threshold configurations. Therefore, in some embodiments of the disclosure, the terminal device may determine the preset rate threshold of the currently connected base station through a predetermined threshold list. The threshold list may store preset rate thresholds of multiple base stations, for example, base stations to which the terminal device has connected in historical connections, base stations manually set by a user in the terminal device, or base stations pre-stored in the preset server. The threshold list may be stored in the preset server and sent to the terminal device when needed, or may also be stored in the terminal device.

The terminal device may acquire an identifier of the base station during the process of establishing a communication connection with the base station. The identifier is used to identify the base station, and different base stations have different identifiers. The identifier may be the number or address of the base station.

The terminal device determines the preset rate threshold of the currently connected base station through the threshold list, so that even if the terminal device switches the connected base station, whether to transmit compensation data may be quickly determined and a data volume of the transmitted compensation data may be quickly adjusted to adapt to the preset rate thresholds of different base stations.

In some embodiments, the method further includes the following operation.

The preset rate threshold is acquired from the threshold list stored in a memory of the preset server or the terminal device.

In some embodiments of the disclosure, the above threshold list may be stored in a preset server, and the preset server may be configured to maintain newly added base station identifiers and corresponding preset rate thresholds, as well as existing base station identifiers and updated preset rate thresholds. When the terminal device needs to maintain a communication connection with the base station, the preset rate threshold corresponding to the base station to which the terminal device is currently connected may be acquired from the preset server. In this way, the threshold list does not need to occupy the storage space of the terminal device, and the terminal device only needs to report the identifier of the currently connected base station to the preset server to easily obtain the preset rate threshold.

In some embodiments of the disclosure, the above threshold list may also be stored in the terminal device. When the terminal device needs to maintain a communication connection with the currently connected base station, it only needs to find the corresponding preset rate threshold in the threshold list according to the base station identifier. It is faster and more convenient, and the possibility of disconnecting from the base station is reduced.

In some embodiments, the method further includes the following operations.

If the threshold list does not include the identifier of the base station, the preset rate threshold is received from the base station. The identifier of the base station and the corresponding preset rate threshold are added to the threshold list.

With the construction of a new base station or the movement of the terminal device, the terminal device may be connected to the new base station, and an identifier of the new base station and a preset rate threshold corresponding to the identifier of the new base station may not be stored in the threshold list. Therefore, the threshold list needs to be updated at this moment. The terminal device may receive the preset rate threshold of the base station from the base station and add it to the threshold list stored in the terminal device, or may send it to the preset server and add it to the threshold list stored in the preset server.

In this way, the threshold list may be dynamically updated when the terminal device communicates with the base station, which is convenient for different base station configurations.

In some embodiments, the base station is a network base station that provides one or more 5G communication services. After performing communication of compensation data with a preset server through the base station, the method further includes the following operations.

A 5G communication connection between the terminal device and the base station is maintained. Communication data is transmitted using the 5G communication connection.

The above communication connection between the terminal device and the base station is a 5G communication connection. After establishing a connection with a network base station capable of providing 5G communication services, the terminal device may transmit data with the base station through a 5G network. The above actual transmission rate between the terminal device and the base station includes a transmission rate of data transmitted between the terminal device and the base station through the 5G network.

When the terminal device transmits compensation data through the base station, a total transmission rate is greater than the preset rate threshold of the base station. Therefore, the base station will not break the 5G communication connection with the terminal device. At this moment, the terminal device will maintain the 5G communication connection with the base station, and use the 5G communication connection to continue to transmit communication data.

In some embodiments, the method further includes the following operation.

If the actual transmission rate is greater than or equal to the preset rate threshold, the transmission of the compensation data is stopped.

In the process of data transmission between the terminal device and the base station, the terminal device may monitor the actual transmission rate with the base station in real time. If the actual transmission rate is greater than or equal to the preset rate threshold, the base station will not break the communication connection with the terminal device. Therefore, there is no need to continue to transmit compensation data, thereby saving unnecessary traffic and power consumption.

Figure 2:
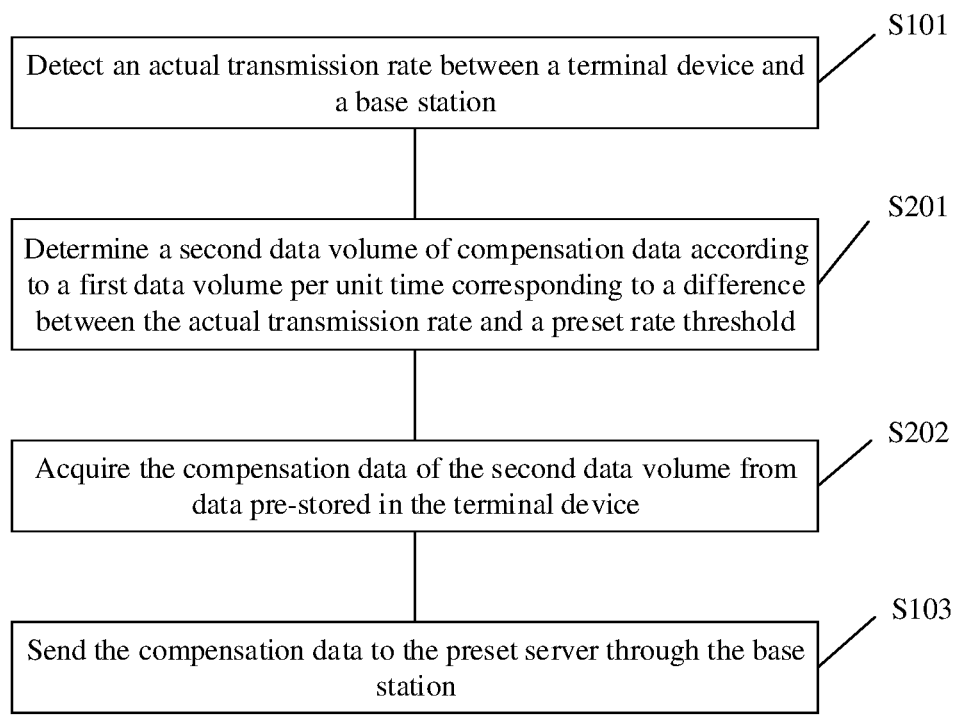
FIG. 2 is a second flowchart of a communication data processing method according to some exemplary embodiments.

In some embodiments, as shown in FIG. 2, in S102, communication of compensation data is performed with a preset server through the base station, including the following operation.

In S103, the compensation data is sent to the preset server through the base station.

In some embodiments of the disclosure, the transmission of compensation data between the terminal device and the preset server may be that the terminal device sends the compensation data to the preset server. The preset server may be a designated dedicated server or may be another server.

After the preset server receives the compensation data sent by the terminal device, it may be directly discarded without any processing. Of course, other processing such as unpacking, decoding, and storage may also be performed.

In some embodiments, as shown in FIG. 2, the method further includes the following operations.

In S201, a second data volume of the compensation data is determined according to a first data volume per unit time corresponding to the difference between the actual transmission rate and the preset rate threshold. The second data volume is greater than or equal to the first data volume.

In S202, the compensation data of the second data volume is acquired from data pre-stored in the terminal device.

In some embodiments of the disclosure, if the terminal device is used as a sender of the above compensation data, data of a specified data volume may be acquired as the compensation data from the data pre-stored in the terminal device. The above pre-stored data may be any data stored in any storage area in the terminal device, or may be data stored in a specific area exclusively used as compensation data.

In order to improve the security of terminal data, here, after compensation data is determined, the compensation data may be packaged, and an identifier of the compensation data may also be carried in a data packet, so that the compensation data is discarded directly after being received by the preset server.

After determining a difference between the actual transmission rate and the preset rate threshold, the data volume of the required compensation data, i.e., the above mentioned second data volume, may be determined according to the difference. According to the above difference between the rates, the corresponding data volume per unit time may be determined. For example, if the above difference is 10M/s (mega per second), it may be determined that the volume of data that needs to be compensated per second is at least 10M. Therefore, it may be determined that the compensation data is data greater than 10M, and the compensation data needs to be sent to the preset server at a rate of at least 10M/s.

In this way, by sending the compensation data of the second data volume to the preset server by the terminal device, the data transmission rate between the terminal device and the base station can be compensated, thereby maintaining the data communication between the terminal device and the base station.

Figure 3:
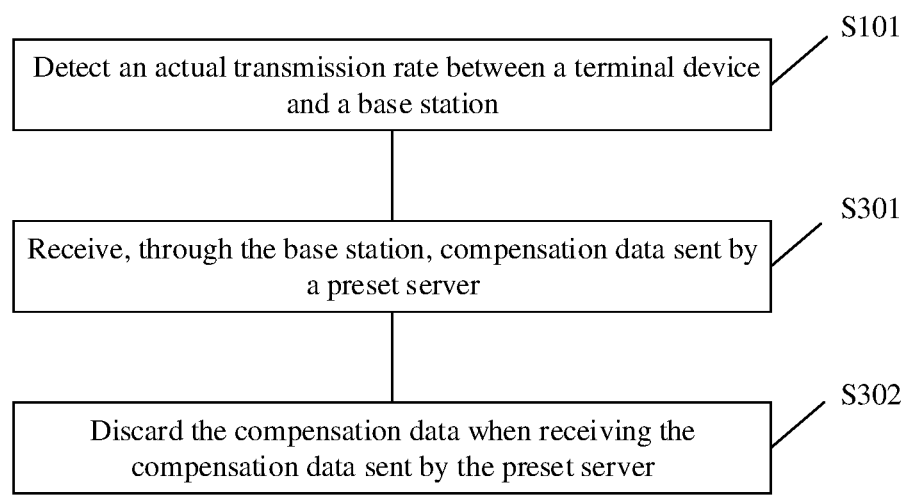
FIG. 3 is a third flowchart of a communication data processing method according to some exemplary embodiments.

In some embodiments, as shown in FIG. 3, in step S102, communication of compensation data is performed with a preset server through the base station, including the following operation.

In S301, the compensation data sent by the preset server is received through the base station.

The method further includes the following operation.

In S302, when receiving the compensation data sent by the preset server, the compensation data is discarded.

In some embodiments of the disclosure, the terminal device may also realize the compensation of the data transmission rate by receiving the compensation data sent by the preset server. When detecting that the actual transmission rate is less than the preset rate threshold, the terminal device may send a data request to the preset server, and receive compensation data sent by the preset server according to the data request.

When needing to perform data compensation, the terminal device sends a compensation data request to the preset server. The compensation data request carries identification information of the terminal device, a data volume of the required compensation data, and the like. When receiving the compensation data request, the preset server sends compensation data to the terminal device according to the data volume indicated by the compensation data request. In the process of monitoring the actual transmission rate, the terminal device also needs to adjust the data volume of the compensation data in real time according to the difference between the actual transmission rate and the preset rate threshold, and re-send the compensation data request to the preset server, or notify the preset server to update the compensation data. In addition, if the location of the terminal device changes, the terminal device may be connected to other base stations. Therefore, the terminal device also needs to re-determine the data volume of the compensation data according to the updated preset rate threshold of the base station, and notify the preset server.

In some embodiments of the disclosure, the terminal device may pre-store preset transmission rates of different base stations, or acquire the preset transmission rate of the current base station at any time from the preset server that stores the preset transmission rates of different base stations.

Since the compensation data is only used to compensate for the data transmission rate between the terminal device and the base station, after the terminal device receives data sent by the preset server, the data may be discarded without any processing and the buffer is released, so that the transmitting and receiving of other data by the terminal device cannot be affected, and it is not necessary to occupy additional storage space.

In some embodiments, when receiving the compensation data sent by the preset server, the compensation data is discarded, including the following operations.

When receiving the compensation data, it is determined whether the compensation data comes from the preset server according to a communication address of a source of the compensation data. If the compensation data comes from the preset server, the compensation data is discarded.

Since there may be other data communication when transmitting and receiving compensation data between the terminal device and the base station, it is necessary to determine whether the received data is compensation data that does not need to be processed when discarding the compensation data. In some embodiments of the disclosure, if the preset server is a dedicated server for sending compensation data to compensate the data transmission rate between the terminal device and the base station, a communication address of a source of the received data may be identified. If the received compensation data comes from the preset server, it is determined that the received compensation data does not need to be processed, so the compensation data may be directly discarded.

Of course, if the preset server is not the above dedicated server, the terminal device may also perform operations such as unpacking and decoding on the received compensation data, and determine, by identifying an identifier carried in the compensation data, that there is no need to save the compensation data or perform other processing. Therefore, the compensation data may be deleted and the buffer may be released at this moment.

In some embodiments, the method further includes the following operations. The terminal device determines, according to whether a communication connection maintenance function of a predetermined network is enabled, whether to enable the function of transmitting compensation data according to the actual transmission rate. If the communication connection maintenance function of the predetermined network is not enabled, the actual transmission rate between the terminal device and the base station is not detected, and compensation data is not sent.

In other words, if the terminal device has enabled the communication function of the predetermined network, it is considered that the terminal device needs to continuously connect to the base station and maintain the communication of the predetermined network. If the terminal device does not enable the communication function of the predetermined network, it is considered that the terminal device does not need to the continuous communication of the predetermined network. Therefore, the network resources of the predetermined network may not be occupied. The predetermined network may be a high-performance communication network with relatively scarce network resources, for example, a network under construction or popularization, such as a 5G network.

In some other embodiments, the method further includes the following operations. The terminal determines, according to whether the current time belongs to a predetermined time period, whether to enable the function of transmitting compensation data according to the actual transmission rate. If the current time does not belong to the predetermined time period, the actual transmission rate between the terminal device and the base station is not detected, and compensation data is not sent.

For example, in the early morning hours, network resources are occupied less, and the communication rate of the terminal device may also be low. However, in this time period, the terminal device does not need to occupy network resources for a long time. Even if the connection with the base station is broken, it is easy to re-establish the connection. Therefore, there is no need to transmit compensation data. In busy hours during the day, network resources are scarce, and the terminal device urgently needs to occupy network resources for a long time. Therefore, the above function of transmitting compensation data according to the actual transmission rate may be enabled.

In addition, the terminal device may also determine, according to at least one of the currently subscribed traffic package type, remaining traffic, and remaining charges, whether it is necessary to enable the above function of transmitting compensation data according to the actual transmission rate. In this way, while improving the performance of the network connection and reducing the disconnection of the communication network from the base station, the actual needs of the user may be taken into consideration and the waste of resources may be reduced.

The embodiments of the disclosure also provide the following examples.

A 5G terminal device is rapidly popularizing, but the current 5G resources are still limited, and the increasing speed of a network device may be difficult to match the popularization speed of the 5G terminal device. Therefore, when the terminal device is connected to the 5G network, in some cases, the base station may release 5G resources of a mobile phone to cause the terminal device to be unable to connect to the 5G network, thereby reducing user experience.

For example, when a mobile phone is connected to the 5G network, if the mobile phone is in a small traffic situation and the data transmission rate with the base station is lower than a minimum rate threshold set by the base station, the base station will consider that the mobile phone does not need the 5G network temporarily, so the current 5G resources will be released and allocated to other terminal devices. At this moment, the mobile phone cannot use the 5G network. When the 5G network needs to be used for large traffic transmission in the future, if there are currently many 5G terminal devices using the 5G resources of the same base station, it may be difficult for the mobile phone to access the 5G network.

Therefore, in some embodiments of the disclosure, in order to allow 5G terminal devices to stay on the 5G network as long as possible for using 5G resources, rate monitoring and data transmission compensation modes are used to reduce the disconnection of the base station and the terminal device.

The embodiments of the disclosure use a "movement rate detection module" to acquire the current rate of mobile traffic by reading a system interface. Since the rate of system traffic is constantly changing, the module will monitor the changes of traffic in real time.

In some embodiments of the disclosure, a "5G base station rate management module" may also be used in the terminal device to manage the preset rate threshold of each base station, that is, a 5G minimum rate, and store a relationship between base station identifiers, such as base station numbers, and the corresponding preset rate thresholds in the form of a list. As shown in Table 1 below:

TABLE 1

| 5G Base Station ID | 5G Minimum Rate |
|---|---|
| ID_1 | 30 M/s |
| ID_2 | 40 M/s |
| ... | ... |

In some embodiments, the preset rate threshold of each base station may be dynamically configured, because each operator can configure a different minimum rate according to a load situation of each base station. Operators can dynamically adjust the configuration on a server. Therefore, when the terminal device is registered to different base stations during the process of location movement, the "5G base station rate management module" may update the preset rate threshold according to the currently registered base station ID, for example, acquire the minimum rate of the latest base station through the server, and synchronize the dynamic configuration.

In addition, the terminal device may also use a "5G traffic control module" for subsequent traffic control. When a user enables the 5G network function, it means that the user may need to use the 5G network continually. When the function is not enabled, it means that the user does not need to use the 5G network temporarily. Therefore, traffic control may take effect after confirming that the terminal device enables the 5G network function.

When the "5G traffic control module" becomes effective, the 5G minimum rate corresponding to the base station to which the terminal device is registered currently, that is, the above preset rate threshold, is determined. Of course, if the location of the terminal device has moved currently and the registered base station ID has changed, the "5G traffic control module" may be notified through the "5G base station rate management module" to update the preset rate threshold.

The "movement rate detection module" sends the current data transmission rate with the base station detected in real time to the "5G traffic control module" to determine whether subsequent rate compensation is required. If the current rate is greater than or equal to the preset rate threshold, rate compensation is not required. If the current rate is less than the preset rate threshold, rate compensation is required.

When performing rate compensation, the "5G traffic control module" first calculates a difference between the current rate and the preset rate threshold, i.e., calculating a rate compensation value, to determine how much data needs to be compensated per second. For example, if the preset rate threshold is 30M/s and the current rate is 20M/s, the rate compensation value is a rate greater than or equal to 10M/s.

Then, the "5G traffic control module" may establish a connection with a preset server. The preset server may only be used to receive compensation data sent by the terminal device, and the data may be directly discarded without any processing. Since a data packet sent by the terminal device is for the base station to obtain information indicating that the terminal device has reached the preset rate threshold currently, there is no actual information in the sent data packet, and the preset server may directly discard the data packet.

After successfully connecting to the preset server, the "5G traffic control module" may read a large file locally on the terminal device, read data equivalent to the volume of data transmitted per unit time corresponding to the preset rate threshold therefrom, encapsulate the data into a data packet through the system interface, and send the data packet to the preset server. Of course, the terminal device may also realize the compensation of the data transmission rate by receiving the data packet sent by the preset server.

In some embodiments of the disclosure, the "movement rate detection module" monitors the change of the communication rate between the terminal device and the base station in real time, and may read the actual data transmission rate of the terminal device every second. When the rate changes, once the rate is reduced to be lower than the preset rate threshold, the above operations will be performed to compensate the data. In addition, the size of the data packet of the compensation data may also be adjusted according to the real-time difference between the actual transmission rate and the preset rate threshold.

If it is monitored that the actual transmission rate between the terminal device and the base station is greater than the preset rate threshold, the transmission of the compensation data may be stopped.

Through the technical solutions of the embodiments of the disclosure, the data transmission rate between the terminal device and the base station can be compensated to achieve the minimum rate for maintaining the connection with the base station, thereby maintaining the connection between the terminal device and the base station, and reducing the occur of the situation that the base station releases 5G resources of the terminal device. In addition, the technical solutions in some embodiments of the disclosure may effectively maintain the 5G resource connection of the terminal device without special processing by an application program of the terminal device.

Figure 4:
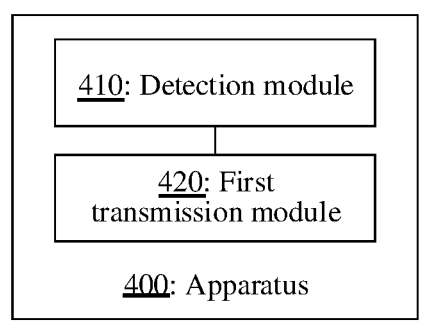
FIG. 4 is a structural block diagram of a communication data processing apparatus according to some exemplary embodiments.

FIG. 4 is a block diagram of a communication data processing apparatus, according to an exemplary embodiment. Referring to FIG. 4, the apparatus 400 is applied to a terminal device, and includes a detection module 410 and a transmission module 420.

The detection module 410 is configured to detect an actual transmission rate between the terminal device and a base station.

The first transmission module 420 is configured to perform, if the actual transmission rate is less than a preset rate threshold for maintaining a connection between the terminal device and the base station, communication of compensation data with a preset server through the base station according to a difference between the actual transmission rate and the preset rate threshold. The sum of a transmission rate of the compensation data and the actual transmission rate is greater than or equal to the preset rate threshold.

In some embodiments, the apparatus further includes a first determination module and a second determination module.

The first determination module is configured to determine an identifier of the base station connected to the terminal device.

The second determination module is configured to determine the preset rate threshold according to the identifier and a predetermined threshold list, the threshold list including preset rate thresholds and identifiers of one or more base stations, where each of the preset rate thresholds corresponds to a respective one of the identifiers of the one or more base stations. In some embodiments, the identifier of the base station may be the base station identifier of the base station.

In some embodiments, the apparatus further includes a first acquisition module.

The first acquisition module is configured to acquire the preset rate threshold from the threshold list stored in a memory of the preset server or the terminal device.

In some embodiments, the apparatus further includes a receiving module and an addition module.

The receiving module is configured to receive, if the threshold list does not include the identifier of the base station, the preset rate threshold from the base station.

The addition module is configured to add the identifier of the base station and the preset rate threshold corresponding to the identifier of the base station to the threshold list.

In some embodiments, the base station may be a network base station that provides one or more 5G communication services. The apparatus may further include a maintaining module and a second transmission module.

The maintaining module is configured to maintain a 5G communication connection between the terminal device and the base station.

The second transmission module is configured to transmit communication data using the 5G communication connection.

In some embodiments, the apparatus further includes a stopping module.

The stopping module is configured to stop, if the actual transmission rate is greater than or equal to the preset rate threshold, transmitting the compensation data.

In some embodiments, the apparatus further includes a third determination module and a second acquisition module.

The third determination module is configured to determine a second data volume of the compensation data according to a first data volume per unit time corresponding to the difference between the actual transmission rate and the preset rate threshold, the second data volume being greater than or equal to the first data volume.

The second acquisition module is configured to acquire the compensation data of the second data volume from data pre-stored in the terminal device.

In some embodiments, the apparatus further includes a fourth determination module and a discarding module.

The fourth determination module is configured to determine, when receiving the compensation data, whether the compensation data comes from the preset server according to a communication address of a source of the compensation data.

The discarding module is configured to discard, if the compensation data comes from the preset server, the compensation data.

With respect to the apparatus in the above embodiments, the specific manners for performing operations for individual modules therein have been described in detail in some embodiments regarding the method, which will not be elaborated herein.

Figure 5:
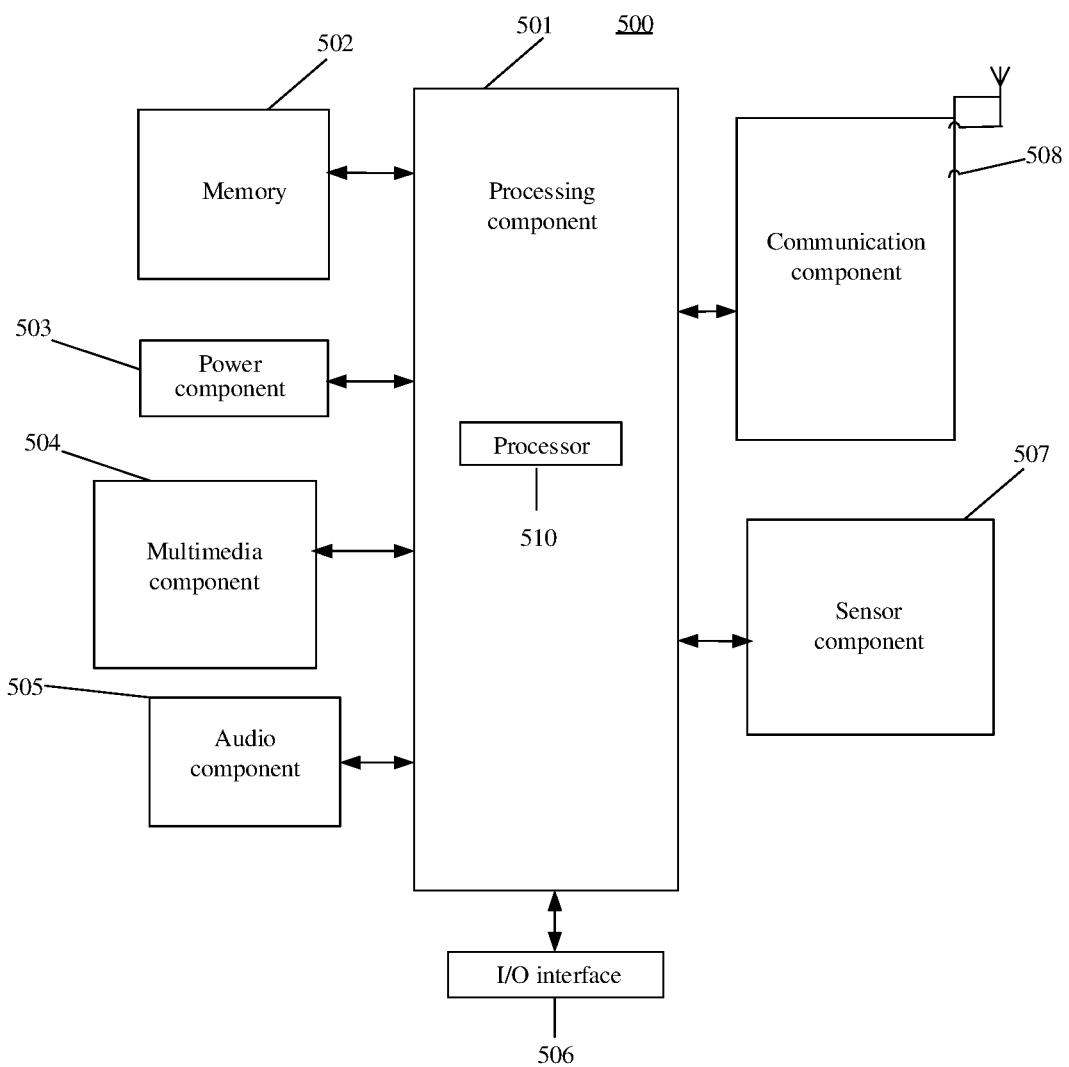
FIG. 5 is a physical structural block diagram of a terminal device, according to some exemplary embodiments.

Referring to FIG. 5, the electronic device 500 may include one or more the following components: a processing component 501, a memory 502, a power component 503, a multimedia component 504, an audio component 505, an Input/Output (I/O) interface 506, a sensor component 507, and a communication component 508.

The processing component or processing circuit 501 typically controls overall operations of the electronic device 500, such as operations associated with display, telephone calls, data communications, camera operations, and recording operations. The processing component 501 may include one or more processors 510 to execute instructions to complete all or part of the operations of the method described above. Moreover, the processing component 501 may further include one or more modules which facilitate the interaction between the processing component 501 and other components. For example, the processing component 501 may include a multimedia module to facilitate the interaction between the multimedia component 504 and the processing component 501.

The memory 510 is configured to store various types of data to support the operation of the electronic device 500. Examples of such data include instructions for any applications or methods operated on the electronic device 500, contact data, phonebook data, messages, pictures, video, etc. The memory 502 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 503 provides power to various components of the electronic device 500. The power component 503 may include a power management system, one or more power sources, and any other components associated with the generation, management and distribution of power in the electronic device 500.

The multimedia component 504 includes a screen providing an output interface between the electronic device 500 and the user. In some embodiments, the screen may include a Liquid Crystal Display (LCD) and a Touch Panel (TP). In some embodiments, an organic light-emitting diode (OLED) display or other types of displays can be adopted.

If the screen includes the TP, the screen may be implemented as a touch screen to receive an input signal from a user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 504 includes a front camera and/or a rear camera. The front camera and/or the rear camera may receive an external multimedia datum while the electronic device 500 is in an operation mode, such as a photographing mode or a video mode. Each front camera and each rear camera may be fixed optical lens systems or may have focal lengths and optical zoom capabilities.

The audio component 505 is configured to output and/or input audio signals. For example, the audio component 505 includes a Microphone (MIC) configured to receive an external audio signal when the electronic device 500 is in an operation mode, such as a call mode, a recording mode, and a voice recognition mode. The received audio signals may be further stored in the memory 510 or transmitted via the communication component 508. In some embodiments, the audio component 505 may further include a speaker to output audio signals.

The I/O interface 506 provides an interface between the processing component 501 and peripheral interface modules, such as a keyboard, a click wheel, or buttons. These buttons may include, but not limited to: a home button, a volume button, a start button, and a lock button.

The sensor component 507 includes one or more sensors to provide status assessments of various aspects of the electronic device 500. For example, the sensor component 507 may detect an open/closed status of the electronic device 500, and relative positioning of components. For example, the component is the display and the keypad of the electronic device 500. The sensor component 507 may also detect a change in position of the electronic device 500 or a component of the electronic device 500, a presence or absence of user contact with the electronic device 500, an orientation or an acceleration/deceleration of the electronic device 500, and a change in temperature of the electronic device 500. The sensor component 507 may include a proximity sensor configured to detect the presence of nearby objects without any physical contact. The sensor component 507 may also include light sense sensors, such as CMOS or CCD image sensors, for use in imaging applications. In some embodiments, the sensor component 507 may also include an acceleration sensor, a gyroscope sensor, a magnetic sensor, a pressure sensor, or a temperature sensor.

The communication component 508 is configured to facilitate communication, wired or wirelessly, between the electronic device 500 and other devices. The electronic device 500 may access a wireless network based on a communication standard, such as Wi-Fi, 2G, 3G, 4G, or 5G, or a combination thereof. In one exemplary embodiment, the communication component 508 receives broadcast signals or broadcast related information from an external broadcast management system via a broadcast channel In one exemplary embodiment, the communication component 508 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, or other technologies.

In exemplary embodiments, the electronic device 500 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, for performing the above described methods.

In the exemplary embodiments, a non-transitory computer-readable storage medium including an instruction, such as a memory 502 including an instruction, is further provided. The instruction may be executed by a processor 510 of an electronic device 500 to complete the foregoing method. For example, the non-transitory computer-readable storage medium may be an ROM, a Random-Access Memory (RAM), a CD-ROM, a magnetic tape, a floppy disk, an optical data storage device, and the like.

When instructions in a non-transitory computer-readable storage medium are executed by a processor of a mobile terminal, the mobile terminal is caused to perform any of the methods provided in the above embodiments.

The various device components, modules, circuits, units, blocks, or portions may have modular configurations, or are composed of discrete components, but nonetheless can be referred to as "modules" or "portions" etc. in general. In other words, the "components," "modules," "circuits," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "I" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A communication data processing method, applied to a terminal device, comprising:
   detecting an actual transmission rate between the terminal device and a base station; and
   in response to the actual transmission rate being less than a preset rate threshold for maintaining a connection between the terminal device and the base station, performing, according to a difference between the actual transmission rate and the preset rate threshold, communication of compensation data with a preset server through the base station,
   wherein a sum of a transmission rate of the compensation data and the actual transmission rate is greater than or equal to the preset rate threshold,
   the method further comprises:
   determining an identifier of the base station connected to the terminal device; and
   determining the preset rate threshold according to the identifier and a predetermined threshold list,
   wherein the threshold list comprises preset rate thresholds and identifiers of one or more base stations, and
   wherein each of the preset rate thresholds corresponds to a respective one of the identifiers of the one or more base stations.

2. The method according to claim 1, further comprising:
   acquiring the preset rate threshold from the threshold list stored in a memory of the preset server or the terminal device.

3. The method according to claim 1, further comprising:
   in response to the identifier of the base station not being comprised in the threshold list, receiving the preset rate threshold from the base station; and
   adding the identifier of the base station and the preset rate threshold corresponding to the identifier of the base station to the threshold list.

4. The method according to claim 1, wherein the base station is a network base station that provides a 5G communication service, and after the performing communication of compensation data with a preset server through the base station, the method further comprises:
   maintaining a 5G communication connection between the terminal device and the base station; and
   transmitting communication data using the 5G communication connection.

5. The method according to claim 1, further comprising:
   in response to the actual transmission rate being greater than or equal to the preset rate threshold, stopping transmitting the compensation data.

6. The method according to claim 1, further comprising:
   determining a second data volume of the compensation data according to a first data volume per unit time corresponding to the difference between the actual transmission rate and the preset rate threshold, wherein the second data volume is greater than or equal to the first data volume; and
   acquiring the compensation data of the second data volume from data pre-stored in the terminal device.

7. The method according to claim 1, further comprising:
   in response to receiving the compensation data, determining, according to a communication address of a source of the compensation data, whether the compensation data comes from the preset server; and
   in response to the compensation data coming from the preset server, discarding the compensation data.

8. A mobile terminal implementing the method according to claim 1, wherein the mobile terminal is configured to:
   maintain the transmission rate to maintain a communication connection state with the base station, to thereby avoid the transmission rate being lower than the preset rate threshold and the base station being disconnected from the mobile terminal device; and
   maintain the transmission rate to be always above the preset rate threshold of the base station by way of performing communication of compensation data with the preset server, to thereby reduce time waste or difficulty in re-establishing a connection with the base station, and improve efficiency of the mobile terminal using resources of the base station resources;

wherein the base station is a 5G base station.

9. A terminal device comprising:

a processor; and memory for storing instructions for execution by the processor, wherein when the executable instructions are executed by the processor, the processor is configured to:

detect an actual transmission rate between the terminal device and a base station; and perform communication of compensation data with a preset server through the base station according to a difference between the actual transmission rate and the preset rate threshold in response to the actual transmission rate being less than a preset rate threshold for maintaining a connection between the terminal device and the base station, wherein a sum of a transmission rate of the compensation data and the actual transmission rate is greater than or equal to the preset rate threshold, the processor is further configured to:

determine an identifier of the base station connected to the terminal device; and determine the preset rate threshold according to the identifier and a predetermined threshold list, wherein the threshold list comprises preset rate thresholds and identifiers of one or more base stations, and wherein each of the preset rate thresholds corresponds to a respective one of the identifiers of the one or more base stations.

10. The terminal device according to claim 9, wherein the processor is further configured to:

acquire the threshold list from a memory of the preset server or the terminal device.

11. The terminal device according to claim 9, wherein the processor is further configured to:

receive the preset rate threshold from the base station in response to the identifier of the base station is not comprised in the threshold list; and add the identifier of the base station and the preset rate threshold corresponding to the identifier of the base station to the threshold list.

12. The terminal device according to claim 9, wherein the base station is a network base station that provides one or more 5G communication services, and the processor is further configured to:

maintain a 5G communication connection between the terminal device and the base station; and transmit communication data using the 5G communication connection.

13. The terminal device according to claim 9, wherein the processor is further configured to:

stop transmitting the compensation data in response to the actual transmission rate being greater than or equal to the preset rate threshold.

14. The terminal device according to claim 9, wherein the processor is further configured to:

determine a second data volume of the compensation data according to a first data volume per unit time corresponding to the difference between the actual transmission rate and the preset rate threshold, wherein the second data volume is greater than or equal to the first data volume; and acquire the compensation data of the second data volume from data pre-stored in the terminal device.

15. The terminal device according to claim 9, wherein the processor is further configured to:

determine whether the compensation data comes from the preset server according to a communication address of a source of the compensation data in response to receiving the compensation data; and discard the compensation data in response to the compensation data coming from the preset server.

16. A non-transitory computer-readable storage medium, having computer-executable instructions stored therein, wherein the computer-executable instructions, when executed by a processor, implement operations comprising:

detecting an actual transmission rate between the terminal device and a base station; and in response to the actual transmission rate being less than a preset rate threshold for maintaining a connection between the terminal device and the base station, performing, according to a difference between the actual transmission rate and the preset rate threshold, communication of compensation data with a preset server through the base station, wherein a sum of a transmission rate of the compensation data and the actual transmission rate is greater than or equal to the preset rate threshold the operations further comprise:

determining an identifier of the base station connected to the terminal device; and determining the preset rate threshold according to the identifier and a predetermined threshold list, wherein the threshold list comprises preset rate thresholds and identifiers of one or more base stations, and wherein each of the preset rate thresholds corresponds to a respective one of the identifiers of the one or more base stations.

17. The non-transitory computer-readable storage medium according to claim 16, the operations further comprising:

acquiring the preset rate threshold from the threshold list stored in a memory of the preset server or the terminal device;

in response to the identifier of the base station being not comprised in the threshold list, receiving the preset rate threshold from the base station; and adding the identifier of the base station and the preset rate threshold corresponding to the identifier of the base station to the threshold list.

* * * * *